UNITED STATES PATENT OFFICE 2,031,406

VAT DYESTUFFS OF THE ANTHRAQUINONE-2.1(N) BENZACRIDONE SERIES

Walter Bruck, Mannheim, Germany, assignor to General Aniline Works, Inc., New York, N. Y., a corporation of Delaware No Drawing. Application January 3, 1933, Serial No. 650,048. In Germany January 19, 1932

6 Claims. (Cl. 260—37)

The present invention relates to vat dyestuffs of the anthraquinone-2,1(N)-benzacridone series and process of producing same.

I have found that halogenanthraquinone-2,1(N)-benzacridones corresponding to the general formula:—

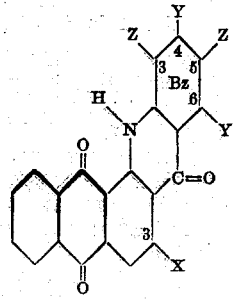

in which X stands for halogen, and in which at least 2 of the positions marked Y and Z are substituted by halogen atoms, at least one of which stands in a position marked Y, are valuable vat dyestuffs which are distinguished by an excellent tinctorial power; for example they possess a greatly increased tinctorial power, as compared with other anthraquinonebenzacridones. Thus for example 3-Bz-3,4,5,6-pentachloranthraquinone-2,1(N)-benzacridone dyes about twice as strongly as 4,Bz-3,4,5,6-pentachloranthraquinone-2,1(N)-benzacridone. The new dyestuffs have excellent fastness properties. The dyestuffs containing bromine or iodine besides or instead of chlorine have similar properties as compared with the dyestuffs containing chlorine. The dyestuffs may be prepared for example by condensing 1,3-dihalogenanthraquinone-2-carboxylic acids or 1-nitro-3-halogenanthraquinone-2-carboxylic acids or derivatives substituted in the carboxyl group of the said compounds for example their esters, such as their methyl, ethyl, benzyl and phenyl esters, with anilines in which one ortho position to the amino group is unoccupied and containing at least two halogen atoms at least one of which is in the 3- or 5-position, and subsequent ring closure to form acridones. The dyestuffs may also be prepared by the action of ortho-aminobenzoic acids containing at least two halogen atoms at least one of which is in the 4- or 6-position on 1,3-dihalogenanthraquinones and subsequent ring closure to form acridones. The halogenanthraquinonebenzacridones of the said kind may also be obtained by introducing halogen into 3-halogenanthraquinonebenzacridones which may already contain halogen in the Bz-ring. It is not necessary to carry out this treatment in the presence of halogenating catalysts; substances of this kind, such as iodine, may, however, be used, if desired.

The following examples will further illustrate the nature of this invention but the invention is not restricted to these examples. The parts are by weight.

Example 1

22 parts of 1,3-dichloranthraquinone-2-carboxylic acid benzyl ester are heated to from 180° to 190° C., for about 5 hours with 12 parts of 2,3,4,5-tetrachloraniline, 6 parts of anhydrous sodium acetate, 0.3 part of copper oxide and 30 parts of nitrobenzene. After cooling, about 200 parts of concentrated sulphuric acid are allowed to flow into the reaction mixture and it is then heated for an hour at about 40° C. The reaction mass is poured into water and the nitrobenzene expelled with steam. The remaining 1-tetrachloranilido-3-chloranthraquinone-2-carboxylic acid is filtered off by suction and dried.

22 parts of this product are stirred at from 150° to 160° C. for about 2 hours with 85 parts of dry nitrobenzene and 10 parts of acetic anhydride. The reaction mixture is then diluted with 85 parts of dry nitrobenzene and 2.5 parts of concentrated sulphuric acid are slowly introduced at from 95° to 100° C. The temperature is kept at about 100° C. for about 3 hours, the whole allowed to cool and the pentachloranthraquinone-2,1(N)-benzacridone formed filtered off by suction. It is washed with nitrobenzene, and freed from nitrobenzene by means of steam and from constituents soluble in alkali by boiling with dilute caustic soda solution. The resulting dyestuff dissolves in concentrated sulphuric acid giving an orange-red coloration and dyes cotton from a violet vat brilliant red shades having a strength which is much greater than that of dyeings obtained with the isomeric 4-Bz,3,4,5,6-pentachloranthraquinone-2,1(N)-benzacridone.

Example 2

14 parts of 1,3-dichloranthraquinone-2-carboxylic acid benzyl ester are heated at from 180° to 185° C. for 3 hours with 8 parts of meta-dichloraniline, 3.6 parts of anhydrous sodium acetate, 0.2 part of copper oxide and 35 parts of nitrobenzene. After cooling, about 100 parts of concentrated sulphuric acid are added to the reaction mixture which is then heated to 40° C. for a short time and introduced into water. The nitrobenzene is expelled with steam and the remaining 1-dichloranilido-3-chloranthraquinone-2-carboxylic acid is filtered off by suction and dried.

19 parts of the acid are stirred at from 150° to 160° C. for 2 hours with 70 parts of dry nitrobenzene and 10 parts of acetic anhydride, the reaction mass diluted with 70 parts of dry nitrobenzene and then 2.5 parts of concentrated sulphuric acid are gradually added thereto at 90° C. The whole is stirred for about 4 hours at from 95° to 100° C., allowed to cool and the resulting 3-chlor-Bz,4,6-dichloranthraquinone-2,1(N)-benzacridone filtered off by suction. It is washed with nitrobenzene, freed from solvent by means of steam and freed from impurities soluble in alkali by boiling with dilute caustic soda solution. The dyestuff dissolves in concentrated sulphuric acid giving an orange coloration and yields a violet vat. The dyestuff yields on cotton an orange dyeing which is at least twice as strong as the orange dyeing with the same amount of the isomeric compound in which one chlorine atom is in the 4-position of the anthraquinone nucleus instead of in the 3-position.

*Example 3*

10.3 parts of 1,3-dichloranthraquinone-2-carboxylic acid benzyl ester are heated at from 180° to 190° C. for 3 hours with 7.5 parts of 3,4,5-trichloraniline, 2.7 parts of sodium acetate, 0.2 part of copper oxide and 35 parts of nitrobenzene. After cooling, about 100 parts of concentrated sulphuric acid are allowed to flow in while stirring, the whole is heated for a short time to 40° C. and the reaction mass poured into water. After distilling off the nitrobenzene with steam, the resulting 1-trichloranilido-3-chloranthraquinone-2-carboxylic acid is filtered off by suction and dried.

14.2 parts of this product are stirred at from 150° to 160° C. for 3 hours with 50 parts of nitrobenzene and 7 parts of acetic anhydride. The reaction mixture is then diluted with 50 parts of nitrobenzene and 1.7 parts of concentrated sulphuric acid are gradually introduced at from 95° to 100° C. The temperature is kept constant for about 3 hours, the whole allowed to cool and the tetrachloranthraquinone - benzacridone having the formula:

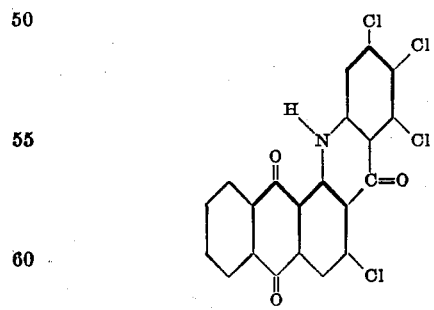

which separates out in the form of crystals, filtered off by suction. It is washed with nitrobenzene, benzene, and ligroin and freed from impurities soluble in alkali by boiling with dilute caustic soda. The dyestuff dissolves in concentrated sulphuric acid giving a red coloration and dyes cotton from a violet vat brilliant yellowish-red shades. In this case also there is a very great difference in strength between the shades obtained with the said dyestuff and those obtained with the isomeric compound in which the chlorine atom is in the 4-position of the anthraquinone nucleus instead of in the 3-position.

*Example 4*

If the 3,4,5-trichloraniline in Example 3 be replaced by 2,4,5-trichloraniline, the remaining procedure in the said example being otherwise exactly followed, a tetrachloranthraquinone-2,1(N)-benzacridone having the formula:—

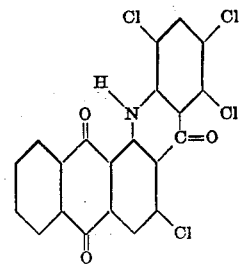

is obtained. It dissolves in concentrated sulphuric acid giving an orange-red coloration and yields a violet vat from which cotton is dyed substantially more bluish-red shades than when using the product obtained according to Example 3, but also has a much greater strength of color as compared with the isomeric 4-Bz,3,5,6-trichloranthraquinone-2,1(N)-benzacridone.

*Example 5*

25 parts of the product obtained according to Example 2 are suspended in 600 parts of nitrobenzene. 0.6 part of iodine is added and the mixture is heated to 70° C. At this temperature a mixture of 24 parts of bromine and 70 parts of nitrobenzene is added. The mixture is stirred vigorously for about 3 hours at between 70° and 80° C. and then the temperature is raised in the course of 3 hours up to 200° C. The reaction mixture is allowed to cool and the reaction product is filtered off by suction, washed with nitrobenzene and with benzene and ligroin, and recrystallized from trichlorbenzene. According to analysis it consists mainly of trichlorodibromo-anthraquinone-2,1(N)-benzacridone. Probably the bromine atoms are contained in the 3- and 5-positions of the Bz-nucleus. The product dissolves in concentrated sulphuric acid giving a red coloration from which it is precipitated by water in red flakes. The dyestuff dyes cotton red shades of good fastness properties from a violet vat.

What I claim is:—

1. Vat dyestuffs of excellent fastness properties and tinctorial power corresponding to the general formula

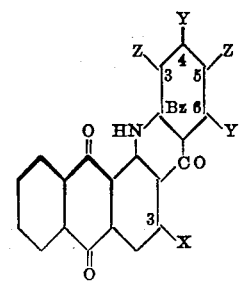

in which X stands for halogen, and in which at least two of the positions marked Y and Z are substituted by halogen atoms, at least one of which stands in a position marked Y, said dyestuffs dissolving in concentrated sulphuric acid giving an orange to red coloration and giving a violet vat from which cotton is dyed orange to bluish-red shades.

2. Vat dyestuffs of excellent fastness properties and tinctorial power corresponding to the general formula

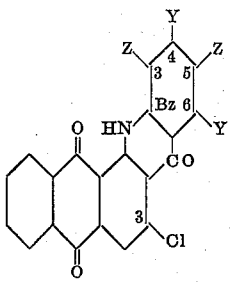

in which at least two of the positions marked Y and Z are substituted by chlorine atoms, at least one of which stands in a position marked Y, said dyestuffs dissolving in concentrated sulphuric acid giving an orange to red coloration, giving a violet vat from which cotton is dyed orange to bluish-red shades.

3. The vat dyestuff corresponding to the formula

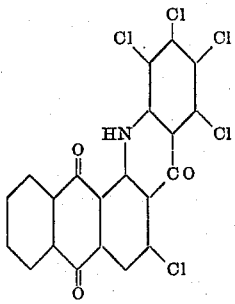

dissolving in concentrated sulphuric acid giving an orange-red coloration and dyeing cotton from a violet vat very strong brilliant red shades.

4. The vat dyestuff corresponding to the formula

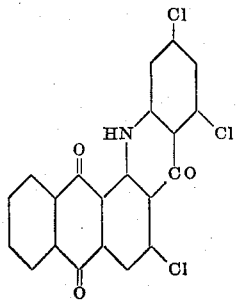

dissolving in concentrated sulphuric acid giving an orange coloration and dyeing cotton from a violet vat very strong orange shades.

5. The vat dyestuff corresponding to the formula

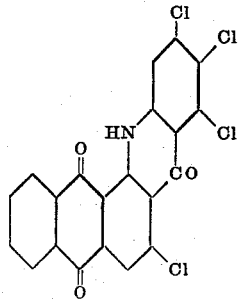

dissolving in concentrated sulphuric acid giving a red coloration and dyeing cotton from a violet vat strong brilliant yellowish-red shades.

6. The process of producing vat dyestuffs of the anthraquinone-2,1 (N)-benzacridone series which comprises condensing a compound corresponding to the formula:

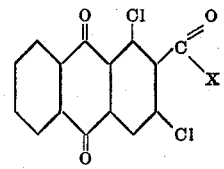

in which X stands for —OH or —OR (R being alkyl or benzyl) with an aniline corresponding to the formula:

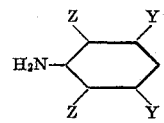

said aniline containing at least two halogen atoms, at least one of which stands in a position marked Y, at least one position marked Z being unsubstituted, and subjecting the condensation product to ring closure to form an anthraquinone-2,1(N)-benzacridone.

WALTER BRUCK.